Dec. 5, 1944.  D. M. WEIGEL  2,364,330
INTERNAL-COMBUSTION ENGINE
Filed March 16, 1942  3 Sheets-Sheet 1
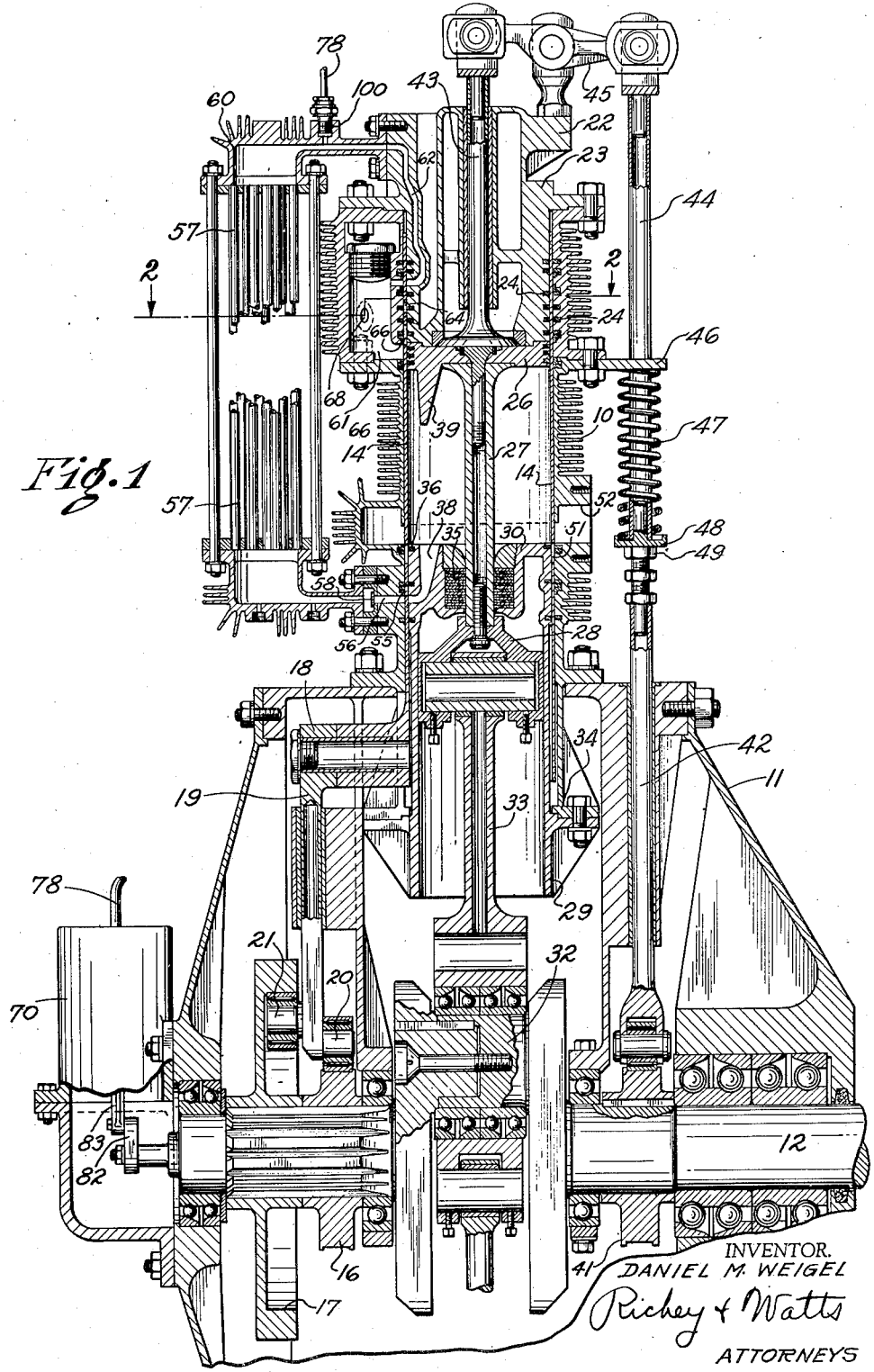
INVENTOR.
DANIEL M. WEIGEL
Richey & Watts
ATTORNEYS Dec. 5, 1944. D. M. WEIGEL 2,364,330
INTERNAL-COMBUSTION ENGINE
Filed March 16, 1942  3 Sheets-Sheet 2

INVENTOR.
DANIEL M. WEIGEL
BY Rickey & Watts
ATTORNEYS

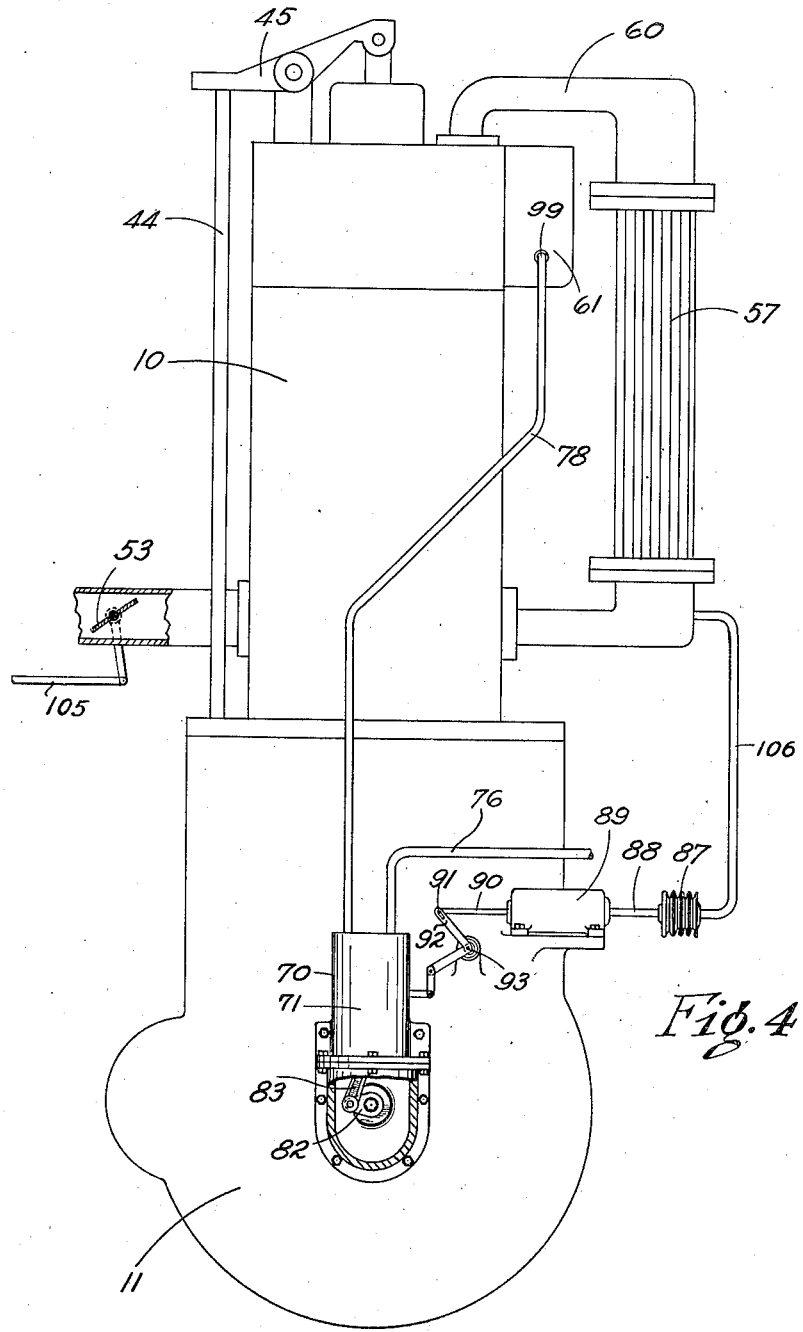

Patented Dec. 5, 1944

2,364,330

UNITED STATES PATENT OFFICE 2,364,330

INTERNAL-COMBUSTION ENGINE

Daniel Michael Weigel, Detroit, Mich.

Application March 16, 1942, Serial No. 434,837

14 Claims. (Cl. 123—74)

This invention relates to internal combustion engines, and particularly to an improvement in the type of engine disclosed and claimed in my prior Patent No. 2,220,926, dated November 11, 1940.

Various ways have been proposed to substitute an injection of liquid fuel for the usual carburetion systems in engines of the constant volume combustion type, such as the conventional Otto cycle engines, as distinguished from constant pressure combustion, or Diesel cycle, engines. In injection engines of the constant volume type the fuel is ordinarily injected directly into the cylinder during the intake stroke of the piston. Such a cycle of operation subjects the fuel and air mixture to adiabatic compression during the compression stroke of the engine, thereby necessitating the retention of the compression ratio below a value which will raise the mixture to the self combustion temperature. While it has been possible through improvements in fuel to attain compression ratios of about seven to one, further increase in the ratio has been impeded by the self-ignition of the fuel mixture due to the increase in temperature during adiabatic compression.

The principal objects of the present invention are to remove the limitation imposed on the compression ratio by the adiabatic compression, in injection engines of the constant volume combustion type; to perform a complete cycle of work corresponding to the Otto cycle in one revolution of the crankshaft with injection of liquid fuel rather than carburetion and inspiration of fuel mixture; and to facilitate the attaining of high mixture pressures without danger of preignition by injecting the fuel into the air after the air has been compressed and cooled.

Other objects and advantages more or less ancillary to the foregoing and the manner in which all the various objects are realized will appear in the following description, which considered in connection with the accompanying drawings, sets forth preferred embodiments of the invention.

Referring to the drawings:

Figure 1 is a transverse sectional view of a single cylinder of an internal combustion engine constructed according to the present invention;

Figure 4 is a diagrammatic view with the intercooler and combustion chamber turned 90° with respect to the crankshaft to show the relation of the engine, the intercooler, and the injector pump and controls.

Figure 3:
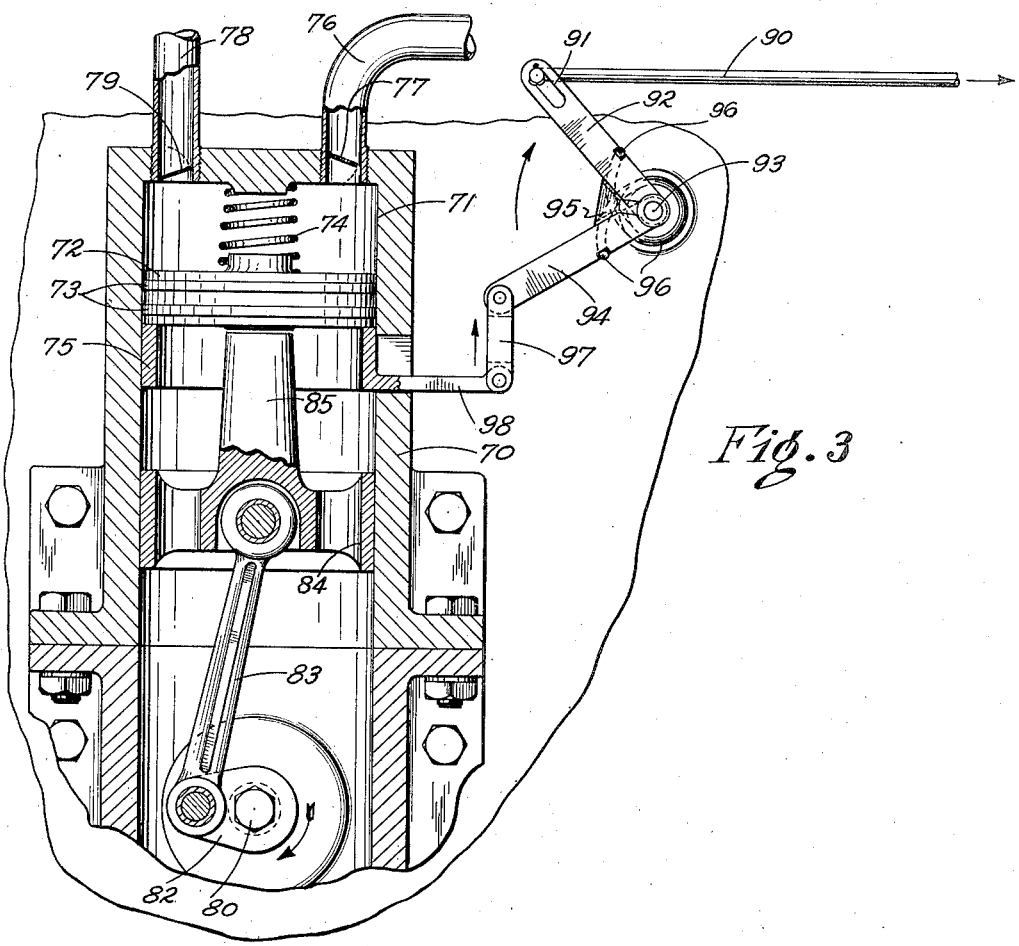
Figure 3 is a sectional view of a fuel injector pump.

The engine illustrated in the drawings includes an air cooled cylinder 10 having secured to its lower end a crank case 11 within which is journaled a crankshaft 12. The cylinder, as illustrated, is of the radial air cooled type, although it will be understood that any desired arrangement and number of cylinders, and any desired type of cooling may be employed.

A sleeve 14 is slidably mounted in the cylinder and is reciprocated by suitable means such as the cams 16 and 17 mounted upon the crankshaft 12. The sleeve 14 is provided adjacent its lower end with an outwardly extending arm 18 having a depending link 19 thereon which is provided with rollers 20 and 21 for engagement with the cams 16 and 17, respectively. The cams 16 and 17 are complementary and arranged to drive the sleeve 14 positively in both directions, so that any desired motion may be given to the sleeve 14. Preferably, however, the sleeve is reciprocated with a true harmonic motion.

A cylinder head 22 having a depending portion 23 is secured to the cylinder 10 with the portion 23 spaced from the walls of the cylinder to define an annular recess for the reception of the upper end of the sleeve 14. A plurality of sealing rings 24 are carried by the portion 23 and by the cylinder 10 to engage the sleeve 14 and seal the cylinder.

A double acting piston 26 is reciprocably mounted within the sleeve 14. The piston is connected to a piston rod 27 secured to a cross head 28 which is slidably mounted in a cylindrical tube 29 projecting downwardly from a lower cylinder cover 30. The cross head 28 is connected to a crank 32 on the crankshaft 12 by connecting rod 33 journalled on the crank and on a wrist pin carried by the cross head 28.

The cylindrical extension 29 of the lower cylinder cover 30 is bolted to the lower end of the engine cylinder 10 by mating flanges as indicated at 34 so that the cover 30 is fixedly secured in position in the cylinder and the extension 29 is secured in alinement with the bore of the cylinder 10 and the inner surface of the sleeve 14.

The cylinder cover 30 is formed with an opening containing a suitable packing gland 35 which slidably receives and seals the piston rod 27. The cylinder cover 30 and the engine cylinder 10 are spaced apart a sufficient distance to permit the sleeve 14 to be received therebetween and suitable packing rings 36 are mounted in the cylinder 10 and the cylinder cover 30 to engage the sleeve and seal the cylinder. Preferably the cylinder cover 30 is formed with a recess 38 to receive a downwardly extending lip 39 formed on the underside of the piston 26 as disclosed in my Patent No. 2,303,966, issued December 1, 1942.

A cam 41 is mounted on the crankshaft 12 and engages a tappet 42 slidably mounted within the crank case 11 for operating a poppet exhaust valve 43 through a push rod 44 and a rocker arm 45. A bracket 46 is secured to the cylinder 10 and constitutes a guide for the push rod 44. A spring 47 is mounted on the push rod 44 and retained in engagement with the bracket 46 by a collar 48 mounted on the push rod 44. The poppet valve 43 is opened through the raising of the push rod 44 upon the rotation of the cam 41 and is closed through the action of the spring 47. The cam 41 is designed to open the exhaust poppet valve 43 a short time prior to the piston reaching its lower, or outer, dead center point and to close the poppet valve prior to the piston reaching its upper, or inner, dead center point.

The cams 16 and 17 for moving the sleeve 14 are arranged to lead the crank 32 and piston 26 by approximately ninety degrees, so that when the piston is at its upper dead center point, as illustrated in Fig. 1, the sleeve will have moved about one-half way through its down or outward stroke. The lower end of the sleeve 14 is provided with an intake port 51 which registers during the upper half of the movement of the sleeve with an intake port 52 formed in the cylinder 10. The intake port 52 is connected to a suitable air intake which is controlled by a throttle 53 arranged to be manually controlled in any suitable way, as by the link 105 (see Fig. 4).

The lower end of the sleeve 14 is also formed with a port 55 arranged to register, during the lower half of the movement of the sleeve, with a port 56 which is formed in the cylinder wall 10 and connected to the inlet end of an intercooler 57. Upon the registering of the port 55 in the sleeve 14 with the port 56 in the cylinder wall the interior of the cylinder is in communication with the intercooler 57 through the slot 48 formed in the cylinder cover 30. An automatic valve 58 is provided at the inlet end of the intercooler to prevent the compressed air within the intercooler 57 from returning to the cylinder 10 upon the registering of the ports 55 and 56. Thus throughout the inward stroke of the piston 26 the outer end of the cylinder is open to atmosphere so as to inspire air, and throughout the outward stroke the inspired air is compressed into the intercooler 57.

The intercooler 57 is provided with an outlet port or header 60, which is arranged to communicate at the desired time with a combustion chamber 61 through a passage 62 formed in the cylinder head 22 and depending portion 23. The upper end of the sleeve 14 is provided with a port 64 which is arranged to register with the passage 62 to provide communication between the combustion chamber 61 and intercooler 57 when the sleeve 14 is about 45° from its inner dead center. The sleeve is also provided with a port 66 which is arranged to provide communication between the combustion chamber 61 and the interior of the cylinder 10 throughout the lower or outer half of the movement of the sleeve. A spark plug, not shown, is mounted within an aperture 68 formed in the combustion chamber to ignite the gaseous mixture therein at the desired time.

A fuel injector pump 70 which may be of any desired type is arranged to inject the desired quantity of liquid fuel into the air compressed in the lower end of the cylinder 10 and cooled in the intercooler 57 so as to provide a combustible mixture in the combustion chamber 61 at the desired times in the cycle of operation.

In the illustrated embodiment, the injector is a variable stroke piston pump driven from the crankshaft 12, one cylinder and piston being provided for each power cylinder of the engine. The pump shown includes a cylinder 71 secured to the crankcase of the engine and having a piston 72 reciprocably mounted therein and provided with suitable sealing rings 73. A spring 74 is arranged to move the piston on its intake stroke and an adjustable ring 75 is slidably mounted in the cylinder to abut the piston and limit the length of the intake stroke. An intake pipe 76 opening into the cylinder 71 leads to a supply of liquid fuel, and is provided with a suitable automatic valve, illustrated diagrammatically at 77, to prevent return flow. A fuel delivery pipe 78 also opens into the cylinder 71 and is provided with a similar valve 79 to permit outward and prevent inward flow.

A crankshaft 80 is arranged to be driven in synchronism with the crankshaft 12 and, as illustrated, is simply a continuation of the crankshaft 12. A crank 82 drives a pitman 83 journalled to a cross head 84 slidably mounted in the cylinder 71 below the adjustable ring 75. The cross head 84 carries a projection 85 spaced from the wall of the cylinder 71 and arranged to abut the under surface of the piston 72 and move it on its pumping stroke against the force of the spring 74.

The quantity of fuel delivered by the injector 70 is arranged to be controlled in conjunction with the throttle valve so as to deliver the desired proportions of fuel and air to the combustion chamber 61 at all times. This is accomplished in the arrangement illustrated by a Sylphon 87 connected by a conduit 106 to the intercooler 57 so that the pressure in the intercooler controls the position of the rod 88 connected to the Sylphon. The rod 88 is connected to a servo-motor 89 of any desired type, such as the conventional oil pressure type, which in turn moves the rod 90 in synchronism with the movement of the Sylphon.

The rod 90 is pivotally connected at 91 to an arm 92 pivotally mounted on the crankcase of the engine at 93. An arm 94 is also pivoted to the crankcase at 93 and a spacer 95 disposed between the arms 92 and 94 is arranged to space the arms apart at about a right angle. A spring 96 wound about the pivot point 93 has its ends engaging the arms 92 and 94 and normally maintaining them in the angular relation fixed by the spacer 95. A link 97 connects the arm 94 with an arm 98 secured to and projecting laterally from the adjustable ring 75.

In operation the underside of the piston 26 inspires air through the air intake 52 controlled by the throttle valve 53 when the piston moves on its inward stroke and valve openings 51 in the sleeve are in alignment with the air intake 52. On the outward stroke of the piston the sleeve closes communication between the air intake 52 and the cylinder and opens the cylinder to the intercooler 57 through the passage 38 and the valve opening 55. The piston thus pumps air into the intercooler 57, the automatic valve 58 opening on the pumping stroke when the pressure in the cylinder has reached the pressure in the intercooler.

While the piston is moving on its inward stroke the sleeve first opens and then closes communication between the combustion chamber 61 and the intercooler 57 through the valve opening 64 in the sleeve. Preferably the opening 64 is so located that communication between the combustion chamber 61 and the passage 62 leading to the intercooler is established after the piston 26 has been moved on its inward stroke through about 45° of crankshaft rotation from outer dead center. Since the cams 16 and 17 are preferably arranged to cause the sleeve to lead the piston by about 90°, the combustion chamber remains in communication with the intercooler through about 90° of crankshaft rotation, or until the piston is about 45° from its inner dead center.

The opening 66 in the sleeve 14 is arranged to open the combustion chamber 61 to the interior of the cylinder at a point about 10° before the piston reaches its inner dead center. Thus the combustion chamber remains in communication with the power cylinder throughout the outward stroke of the piston and until about 10° past outer dead center. On the inward stroke of the piston from its outer dead center, for the first period of about 10° the combustion chamber remains in communication with the cylinder. Thereafter, for the next 35°, the combustion chamber is out of communication with both the cylinder and the intercooler, for the next 90° the combustion chamber is in communication with the intercooler, for the next 35° it is out of communication with both the intercooler and cylinder, and for the final 10° the combustion chamber is again in communication with the cylinder.

At the desired point, which may be at about 45° before the piston reaches its outer dead center, the cam 41 opens the poppet valve 43 in the cylinder head. The valve 43 remains open throughout substantially the entire inward stroke of the piston and preferably closes just in time to avoid escape of the gases entering the cylinder from the combustion chamber 61.

The air inspired by the underside of the piston and compressed into the intercooler 57 is cooled to remove the heat of combustion in any suitable way, as by permitting cooling air to circulate about pipes forming the intercooler, as in the illustrated embodiment. It will be apparent that on each opening of the intercooler to the combustion chamber 61 a volume of compressed air is admitted to the combustion chamber, the amount of air entering the combustion chamber being dependent upon the pressure in the intercooler. After a sufficient number of strokes have been performed to reach equilibrium, a weight of air equal to the weight of one cylinder full of air inspired by the underside of the piston 26 is admitted to the combustion chamber 61 on each cycle, so that the pressure in the intercooler, assuming that all heat of compression is removed, remains constant for any given setting of the throttle valve 53.

Figure 2:
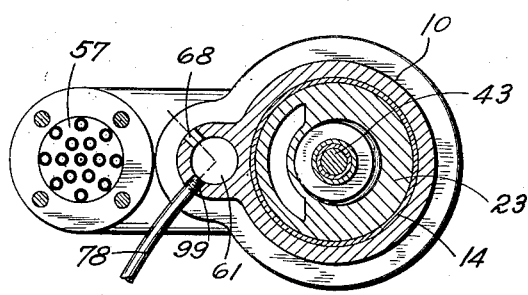
Figure 2 is a section taken on the line 2—2 of Figure 1.

The fuel delivery pipe 78 from the injector pump 70 may lead either to a nozzle 99 in the combustion chamber 61, as illustrated in Figures 2 and 4, or may lead to the nozzle 100 in the delivery end of the intercooler as illustrated in Figure 1. In the arrangement in which the fuel pipe 78 leads to the combustion chamber 61, the fuel injection preferably occurs while the combustion chamber is closed from the cylinder, preferably after the combustion chamber has been opened to the intercooler by the valve port 64. When it is desired to avoid any possibility of the fuel mixing with the air in the intercooler, the injection may take place in the period of about 35° of crankshaft rotation after the combustion chamber has been charged with compressed air and before it is opened to the cylinder, which occurs during the movement of the piston on its inward stroke between 45° and 10° prior to inner dead center. To accomplish this the crank 82 which drives the injector pump is arranged to lead the crank 32 for the power piston 26 by 10° or 15° so that the crank 82 reaches its inner dead center before the combustion chamber 61 is opened to the power cylinder. The maximum stroke of the injector piston 72 is then limited to about 30° or 35°, at which setting the injector piston 72 is arranged to deliver the maximum quantity of fuel desired on each stroke at wide open throttle.

When the throttle 53 is closed from its wide open position, the pressure in the intercooler 57 drops until it reaches a value such that the weight of air admitted to the combustion chamber during each cycle is equal to the weight of air inspired beneath the piston 26 at the new throttle setting. As the pressure in the intercooler drops the Sylphon 87 collapses, moving the rod 88 to the right, as seen in Figure 4, so that the servomotor moves the rod 90 to the right a corresponding amount. The consequent movement of the arm 92 is transmitted to the arm 94 by the spring 96 so as to tend to move the ring 75 inwardly in the cylinder 71 and thereby reduce the extent of the stroke of the piston 72. The spring 96 is arranged to be stronger than the spring 74 so that the spring 74 cannot change the setting of the ring 75, but is not sufficiently strong to force the piston 72 inwardly on its pumping stroke against the resistance of the spring 74 and the resistance to flow provided by the injector nozzle 99 or 100 and the automatic valve 79. Thus if the rod 90 moves to the right while the piston 72 is seated on the ring 75 the arms 92 and 94 simply move apart against the force of the spring 96. On the next inward stroke of the piston 72 under the force of the crank 82 and pitman 83 the ring 75 moves inwardly to its new position at which it remains to limit the extent of the next outward stroke of the piston 72.

With this arrangement the compression ratio for the air, which is the ratio between the volume of the compression end of the cylinder and the volume of the combustion chamber 61, may be set at any desired value. The air may be compressed to this value and the heat of compression removed in the intercooler without danger of explosion at any point in the cycle, because the air alone is compressed and its temperature is reduced below the ignition point before it is admitted to the combustion chamber. With the combustion chamber filled with the cooled compressed air the liquid fuel is then squirted into the combustion chamber. If desired, an interval of time may be allowed to permit thorough mixing and some additional vaporization of the fuel. Thereupon the mixture in the combustion chamber is fired by the spark plug extending into the combustion chamber through the aperture 68, and at or about the time of firing the port 66 opens the combustion chamber to the power cylinder, allowing the expansion stroke to take place. Thus the cycle is substantially the same as the Otto cycle since the highly compressed mixture is burned at substantially constant volume and the expansion takes place adiabatically in the power cylinder, causing the outward stroke of the piston 26. Before the piston reaches its outer dead center the exhaust poppet valve 43 opens, permitting the burned gases to escape through the exhaust. The outward rush of exhaust gases reduces the pressure in the cylinder and in the combustion chamber 61 substantially to atmospheric pressure, after which communication between the combustion chamber and the cylinder is closed by the sleeve 14, and the power cylinder itself is scavenged by the inward movement of the piston 26.

With the fuel delivery pipe 78 connected to the nozzle 100 in the discharge end of the intercooler 57, as illustrated in Figure 1, the fuel injector pump 70 may be timed to deliver the charge of liquid fuel during the period when the conduit 62 leading from the intercooler is open to communication with the combustion chamber 61 through the valve port 64, so that the fuel and air are carried into the combustion chamber at about the same time. The portion of the fuel which is vaporized and remains in the discharge end of the intercooler and in the passage 62 after the valve port 64 closes is equalized by the successive cycles, since the desired quantity of liquid fuel for perfect combustion is delivered by the pump on each cycle. With this arrangement the fuel may also be delivered to the intercooler at other times and permitted to vaporize and be forced into the combustion chamber as a mixture.

The timing of the valves and the ignition may be varied in accordance with the desired speed and other features of the particular engine. Likewise it will be apparent that the general cycle may be carried out in engines having other forms of combustion chambers, valves and the like. For example the various arrangements disclosed in my prior Patent No. 2,220,926 may be utilized, and likewise the arrangements of the combustion chamber and valves disclosed in my copending application Serial No. 391,156, filed April 30, 1941, may be utilized. Similarly the invention may be applied to an engine of any desired number of cylinders and the intercooler may be separate for each cylinder or may be a common reservoir for all of the cylinders, as disclosed in my said Patent No. 2,220,926. Any desired type of fuel injection apparatus, and any desired form of control mechanism to maintain the desired ratio between the quantities of fuel and air admitted to the combustion chamber, such as control mechanism which takes into account the temperature and variations in atmospheric pressure, may be employed if desired. Other rearrangements and modifications may be resorted to without departing from the spirit and scope of the invention as herein claimed.

I claim:

1. An internal combustion engine including a power cylinder having a piston reciprocable therein, a combustion chamber, valve means to alternately open and close communication between said combustion chamber and said cylinder, an intercooler, means for supplying compressed air to said intercooler, said intercooler being arranged to cool the compressed air therein, valve means to alternately open and close communication between said intercooler and said combustion chamber, an exhaust valve in said cylinder, ignition means in said combustion chamber, an injector arranged to inject liquid fuel into the compressed air cooled by said intercooler, and means to operate said valve means, said exhaust valve, said ignition means, and said injector in timed relation to the movement of said piston so as to fill said combustion chamber with a mixture of cooled compressed air and fuel once during each reciprocation of said piston, open said combustion chamber to said cylinder once during each reciprocation of said piston, ignite said mixture to cause the same to expand in said cylinder, and open said exhaust valve once during each reciprocation of said piston.

2. An internal combustion engine including a power cylinder having a piston reciprocable therein, a combustion chamber, valve means to alternately open and close communication between said combustion chamber and said cylinder, an intercooler, means for supplying compressed air to said intercooler, said intercooler being arranged to cool the compressed air therein, valve means to alternately open and close communication between said intercooler and said combustion chamber, an exhaust valve in said cylinder, ignition means in said combustion chamber, an injector arranged to inject liquid fuel into said combustion chamber, and means to operate said valve means, said exhaust valve, said ignition means and said injector in timed relation to the movement of said piston so as to fill said combustion chamber with a mixture of cooled compressed air and fuel once during each reciprocation of said piston, open said combustion chamber to said cylinder once during each reciprocation of said piston, ignite said mixture to cause the same to expand in said cylinder, and open said exhaust valve once during each reciprocation of said piston.

3. An internal combustion engine including a power cylinder having a piston reciprocable therein, a combustion chamber, valve means to alternately open and close communication between said combustion chamber and said cylinder, an intercooler, means for supplying compressed air to said intercooler, said intercooler being arranged to cool the compressed air therein, valve means to alternately open and close communication between said intercooler and said combustion chamber, an exhaust valve in said cylinder, ignition means in said combustion chamber, an injector arranged to inject liquid fuel into the discharge end of said intercooler, and means to operate said valve means, said exhaust valve, said ignition means, and said injector in timed relation to the movement of said piston so as to fill said combustion chamber with a mixture of cooled compressed air and fuel once during each reciprocation of said piston, open said combustion chamber to said cylinder once during each reciprocation of said piston, ignite said mixture to cause the same to expand in said cylinder, and open said exhaust valve once during each reciprocation of said piston.

4. An internal combustion engine comprising a cylinder, a double acting piston reciprocably mounted in the cylinder, an intercooler arranged to cool gas compressed therein, valve means arranged to open one end of the cylinder alternately to an air intake and to said intercooler, a combustion chamber, valve means to open the opposite end of the cylinder alternately to the combustion chamber and to the atmosphere for exhaust, valve means arranged to open said combustion chamber to said intercooler while said combustion chamber is closed from said cylinder, a fuel injector arranged to inject liquid fuel into the compressed air cooled by said intercooler so that said combustion chamber is charged with a mixture of fuel and cooled compressed air, and means to ignite the mixture in said combustion chamber timed to effect expansion of the same into said other end of said cylinder.

5. An internal combustion engine comprising a cylinder, a double acting piston reciprocably mounted in the cylinder, an intercooler arranged to cool gas compressed therein, valve means arranged to open one end of the cylinder alternately to an air intake and to said intercooler, a combustion chamber, valve means to open the opposite end of the cylinder alternately to the combustion chamber and to the atmosphere for exhaust, valve means arranged to open said combustion chamber to said intercooler while said combustion chamber is closed from said cylinder, a fuel injector arranged to inject liquid fuel into said combustion chamber so that said combustion chamber is charged with a mixture of fuel and cooled compressed air, and means to ignite the mixture in said combustion chamber timed to effect expansion of the same into said other end of said cylinder.

6. An internal combustion engine comprising a cylinder, a double acting piston reciprocably mounted in the cylinder, an intercooler arranged to cool gas compressed therein, valve means arranged to open one end of the cylinder alternately to an air intake and to said intercooler, a combustion chamber, valve means to open the opposite end of the cylinder alternately to the combustion chamber and to the atmosphere for exhaust, valve means arranged to open said combustion chamber to said intercooler while said combustion chamber is closed from said cylinder, a fuel injector arranged to inject liquid fuel into the discharge end of said intercooler so that said combustion chamber is charged with a mixture of fuel and cooled compressed air, and means to ignite the mixture in said combustion chamber timed to effect expansion of the same into said other end of said cylinder.

7. An internal combustion engine including a power cylinder having a piston and a combustion chamber, an air reservoir, means for compressing air into said reservoir, means for varying the quantity of air compressed into said reservoir during each cycle of said engine, valve means for admitting separate successive charges of air from said reservoir into said combustion chamber, a pump for injecting liquid fuel into the engine in such a manner as to charge the combustion chamber with a combustible mixture of fuel and compressed air, and means controlled by the air pressure in said reservoir for varying the quantity of fuel delivered by said pump during each cycle of the engine.

8. An internal combustion engine including a power cylinder having a piston and a combustion chamber, an air reservoir, means for compressing air into said reservoir, means for varying the quantity of air compressed into said reservoir during each cycle of said engine, valve means for admitting separate successive charges of air from said reservoir into said combustion chamber, a pump for injecting liquid fuel into said combustion chamber in such a manner as to charge the combustion chamber with a combustible mixture of fuel and compressed air, and means controlled by the air pressure in said reservoir for varying the quantity of fuel delivered by said pump during each cycle of the engine.

9. An internal combustion engine including a power cylinder having a piston and a combustion chamber, an air reservoir, means for compressing air into said reservoir, means for varying the quantity of air compressed into said reservoir during each cycle of said engine, valve means for admitting separate successive charges of air from said reservoir into said combustion chamber, a pump for injecting liquid fuel into said reservoir in such a manner as to charge the combustion chamber with a combustible mixture of fuel and compressed air, and means controlled by the air pressure in said reservoir for varying the quantity of fuel delivered by said pump during each cycle of the engine.

10. An internal combustion engine including a power cylinder having a piston reciprocable therein, a combustion chamber, valve means moving in timed relation to the movement of the piston arranged to establish communication between said combustion chamber and said cylinder throughout each outward stroke of the piston and to close said combustion chamber from said cylinder throughout at least the greater part of each inward stroke of said piston, an exhaust valve in said cylinder, means for opening said exhaust valve near the end of each outward stroke of the piston and for maintaining the same open substantially throughout each inward stroke of the piston, an intercooler arranged to cool gas compressed therein, means for compressing air into said intercooler, valve means arranged to establish communication between said intercooler and said combustion chamber during a part of each inward stroke of said piston when said combustion chamber is closed from said cylinder, to admit cooled compressed air from said intercooler into said combustion chamber, and arranged to maintain said combustion chamber closed from said intercooler throughout the remainder of each cycle of the piston, means operated in timed relation to said piston to inject a predetermined quantity of liquid fuel into said combustion chamber during each inward stroke of the piston while said combustion chamber is closed from said cylinder, and means to ignite the mixture of air and fuel in said combustion chamber near the end of each inward stroke of said piston whereby said mixture is burned at substantially constant volume and adiabatically expanded in said cylinder during each outward stroke of the piston.

11. An internal combustion engine including a power cylinder having a piston reciprocable therein, a combustion chamber, valve means moving in timed relation to the movement of the piston arranged to establish communication between said combustion chamber and said cylinder throughout each outward stroke of the piston and to close said combustion chamber from said cylinder throughout at least the greater part of each inward stroke of said piston, an exhaust valve in said cylinder, means for opening said exhaust valve near the end of each outward stroke of the piston and for maintaining the same open substantially throughout each inward stroke of the piston, an intercooler arranged to cool gas compressed therein, means for compressing air into said intercooler, valve means arranged to establish communication between said intercooler and said combustion chamber during a part of each inward stroke of said piston when said combustion chamber is closed from said cylinder, to admit cooled compressed air from said intercooler into said combustion chamber, and arranged to maintain said combustion chamber closed from said intercooler throughout the remainder of each cycle of the piston, means operated in timed relation to said piston to inject a predetermined quantity of liquid fuel into said combustion chamber during each inward stroke of the piston while said combustion chamber is closed from said cylinder, means to vary the quantity of liquid fuel injected in accordance with the pressure in said intercooler, and means to ignite the mixture of air and fuel in said combustion chamber near the end of each inward stroke of said piston whereby said mixture is burned at substantially constant volume and adiabatically expanded in said cylinder during each outward stroke of the piston.

12. An internal combustion engine including a cylinder having a double acting piston reciprocally mounted therein and dividing said cylinder into a power end and a compression end, an intercooler arranged to cool gas compressed therein, valve means operating to alternately open the combustion end of the cylinder to atmosphere and to said intercooler so as to inspire air and compress the same into said intercooler, a combustion chamber, valve mean operating to open said combustion chamber to the power end of said cylinder throughout each outward stroke of the piston and to close the combustion chamber from the cylinder substantially throughout each inward stroke of the piston, valve means operating to open said intercooler to said combustion chamber during a part of each inward stroke of the piston while said combustion chamber is closed from said cylinder to admit cooled compressed air from said intercooler to said combustion chamber, an injector operating to inject liquid fuel into said combustion chamber during each inward stroke of said piston while said combustion chamber is closed from said cylinder, exhaust valve means in the power end of said cylinder, and ignition means in said combustion chamber.

13. An internal combustion engine comprising a cylinder having a double acting reciprocating piston therein dividing said cylinder into power and compression ends, an intercooler and combustion chamber arranged in series intermediate the compression and power ends of said cylinder, a sleeve interposed between the cylinder and piston and arranged to reciprocate in timed relation with the piston, said sleeve provided with a plurality of ports coacting with ports in the compression end of said cylinder to cause said piston to inspire and compress air into said intercooler, means for injecting liquid fuel into said combustion chamber, said sleeve provided with other ports arranged to open said combustion chamber to the intercooler, close said combustion chamber from said intercooler, and thereafter open said combustion chamber to the power end of the cylinder during each cycle of said piston.

14. An internal combustion engine comprising a cylinder having a double acting reciprocating piston therein dividing said cylinder into power and compression ends, an intercooler and combustion chamber arranged in series intermediate the compression and power ends of said cylinder, a sleeve interposed between the cylinder and piston and arranged to reciprocate in timed relation with the piston, said sleeve provided with a plurality of ports coacting with ports in the compression end of said cylinder to cause said piston to inspire and compress air into said intercooler, means for injecting liquid fuel into said intercooler, said sleeve provided with other ports arranged to open said combustion chamber to the intercooler, close said combustion chamber from said intercooler, and thereafter open said combustion chamber to the power end of the cylinder during each cycle of said piston.

DANIEL M. WEIGEL.